United States Patent Office 2,720,530
Patented Oct. 11, 1955

2,720,530

KETONIC EPOXIDES

Tracy M. Patrick, Jr., Dayton, Ohio, assignor to Monsanto Chemical Company, St. Louis, Mo., a corporation of Delaware No Drawing. Application January 19, 1953,
Serial No. 332,095

11 Claims. (Cl. 260—348)

The present invention relates to addition products and to a method of producing the same.

The invention provides new and highly valuable ketonic adducts containing a plurality of epoxy groups by the free radical-catalyzed addition of one mole of a saturated aliphatic aldehyde of from 2 to 18 carbon atoms with 2 or more moles of butadiene monoxide. The reaction is one of simple addition in which one mole of the aldehyde adds to the epoxide substantially according to the scheme:

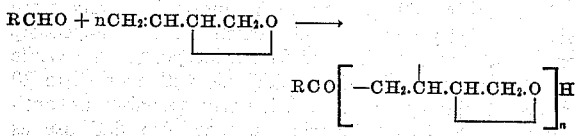

in which R is an alkyl radical of from 1 to 17 carbon atoms and $n$ is an integer of from 2 to 20.

Saturated aldehydes which may be employed according to the invention are, for example, acetaldehyde, propionaldehyde, n-butyraldehyde, isobutyraldehyde, n-valeraldehyde, isovaleraldehyde, methylethylacetaldehyde, n-caproic aldehyde, isohexaldehyde, 2-ethylhexaldehyde, capric aldehyde, undecaldehyde, lauric aldehyde, palmitic aldehyde, stearic aldehyde, etc.

The invention also provides a method of preparing not only the adducts of the above formula, but also a means of preparing ketonic compounds containing only one epoxide group. Thus, I have found that one mole of butadiene oxide adds to one mole of the aliphatic aldehyde as follows:

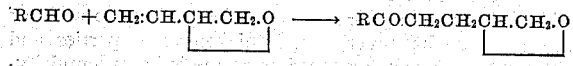

Previously, such ketonic epoxides were obtainable only by oxidation of difficultly obtainable olefinic ketones.

The 1:1 addition products, i. e., 1-acyl-3,4-epoxy-butanes in which the acyl radical is aliphatic and contains from 2 to 18 carbon atoms, are compounds which are advantageously employed as lubricant additives, synthetic resin plasticizers, etc. They are particularly useful as intermediates for the preparation of otherwise difficultly obtainable hydroxy ketones. The 1:2–20 aldehyde butadiene monoxide adducts are particularly valuable as anti-foaming agents for hydrocarbon oils. As disclosed in the copending application of Joseph E. Fields, Serial No. 195,898, filed November 15, 1950, now Patent No. 2,644,794, these higher adducts have the property of reducing or completely inhibiting formation of foam or froth in base stock or compounded hydrocarbon oils.

According to the present process, the aldehyde is contacted with butadiene monoxide in the presence of a free radical-liberating agent as catalyst, and the resulting mixture is allowed to stand at ordinary or increased temperatures until formation of the liquid mixture of adducts has occurred. The resulting reaction mixture may contain some unreacted initial material, 1:1 adduct and higher adducts. The unreacted material and then the 1:1 adduct may be separated from the mixture by fractional distillation. The residue is a liquid mixture of adducts in which one mole of the aldehyde is combined with from 2 to 20 moles of butadiene monoxide. The reaction may be effected by mixing together the aldehyde, the oxide and the catalyst and maintaining the resulting mixture, advantageously with agitation, at a temperature which permits steady decomposition of the catalyst and consequent steady liberation of acyl free-radicals. Or, if desired, the butadiene monoxide may be added gradually, e. g., dropwise, to the aldehyde while constantly maintaining an optimum quantity of active catalyst in the reaction zone, which zone is preferably kept at a temperature conducive to the formation of free-radicals. Depending upon the nature of the individual aldehyde and catalyst and the properties desired in the final product, increased temperatures, e. g., temperatures of from above room temperature to about 125° C. may be generally employed. The reaction time may vary from, say, several hours, to several days. Substantially equimolar quantities of the aldehyde and butadiene monoxide may be used; however, for the production of the present adducts in good yields an excess of the aldehyde is preferred. Catalyst quantities of up to 5 per cent, based on the weight of the oxide may be used.

Formation of the present adducts probably proceeds through a chain mechanism, with termination of the chain at an early stage, i. e., at a point at which probably no more than 20 moles of butadiene monoxide have added to one mole of the aldehyde. Depending upon the nature and the quantity of the aldehyde and of free-radical-liberating agent, as well as upon the reaction conditions, chain propagation may be terminated at various stages to yield mixtures of products in which from 1 to 20 moles of the oxide have added to one mole of the aldehyde.

An extraneous, inert solvent or diluent, e. g., benzene or hexane may be employed, either to serve as catalyst solvent, to mitigate reaction heat, or dilute the concentration of the oxide in the reaction mixture. The use of such a solvent or diluent, however, is generally of little economic advantage.

Free-radical-liberating agents which may be employed in promoting addition of butadiene monoxide to the saturated aliphatic aldehydes are compounds which will decompose to give free radicals. Such compounds include peroxygen-type catalysts, for example acyl peroxides such as acetyl, benzoyl, lauroyl, or stearoyl peroxides; hydrocarbon peroxides or hydroperoxides such as di-tert-butyl peroxide, di-tert-amyl peroxide, tert-butyl hydroperoxide, cumene hydroperoxide or p-cymene hydroperoxide; and inorganic per-compounds such as hydrogen peroxide, sodium peroxide, sodium perborate, potassium persulfate, and alkali percarbonates; hydrazine derivatives such as hydrazine hydrochloride and dibenzoyl hydrazine; organometallic compounds such as tetra-ethyl lead, etc. For convenience, the peroxygen-type catalysts will be hereinafter referred to as peroxidic compounds. Only catalytic quantities of the free-radical-liberating agent need be employed in promoting the addition reaction. Quantities of as little as 0.001 per cent to 1.0 per cent, based on the weight of the oxide are generally sufficient to give optimum yields of the present adducts. In order to avoid detrimental side reactions, quantities of more than 5 per cent of the catalyst, based on the weight of the oxide should not be employed. Ultra-violet light may be employed with the catalyst or as the sole catalytic agent.

The invention is further illustrated, but not limited, by the following examples:

*Example 1*

A mixture consisting of 35 g. (0.5 mole) of butadiene monoxide and 108 g. (1.5 mole) of n-butyraldehyde was brought to refluxing temperature (71.2° C.) and 0.5 g. of benzoyl peroxide was then added. The resulting reaction mixture was maintained at a temperature of from 71.2° C. to 74° C. for 40.5 hours. During this time, two additional 0.5 g. portions of benzoyl peroxide were added to the reaction mixture (at the end of 16.5 hours and at the end of 24.5 hours, respectively). Unreacted material was removed by distilling the product up to 75° C. at atmospheric pressure, and further fractionation under partial vacuum gave the substantially pure 1:1 adduct, 7,8-epoxy-4-octanone, B. P. 59–73° C./10 mm. (mostly 62–3° C./10 mm.) $n_D^{25}$ 1.469. The residue was a liquid mixture of adducts of one mole of n-butyraldehyde with 2 to 20 moles of butadiene monoxide.

*Example 2*

This example is like Example 1, except that a longer heating time and greater quantities of reactants were employed. The reaction mixture, consisting of 216 g. (3.0 moles) of n-butyraldehyde, 70 g. (1.0 mole) of butadiene monoxide and 2.0 g. of benzoyl peroxide was maintained at a temperature of about 74° C. for 68.5 hours. During this time an additional 1.5 g. of catalyst was added to the reaction mixture. Unreacted initial material was removed from the product; and the residue, consisting of a liquid mixture of adducts in which one mole of n-butyraldehyde is combined with from 1 to 20 moles of butadiene monoxide was distilled to yield a fraction B. P. 30° C.–81° C./10 mm., $n_D^{25}$ 1.4562 comprising chiefly the 1:1 butyraldehyde-butadiene monoxide adduct and as residue a liquid mixture, $n_D^{25}$ 1.4918, of adducts of one mole of the aldehyde with from 2 to 20 moles of butadiene monoxide. As shown in Example 3, the mixture of higher adducts is a very active defoaming agent.

*Example 3*

This example shows the antifoaming efficacy of the mixture of adducts, B. P. above 81° C./10 mm., prepared in Example 2 and also provides a comparison of these higher ketonic epoxy compounds with a known low-molecular weight epoxy ketone, 5,6-epoxy-6-methyl-2-heptanone.

The following testing procedure was used:

Champlin 30 base oil (25 cc.) was placed in a 100-ml. graduated cylinder in the top of which was inserted a two-hole rubber stopper. A nitrogen-inlet tube extended through this stopper, to the bottom of which was attached a gas diffuser. The length of the inlet tube was adjusted so that when the apparatus was assembled, the diffuser just touched the bottom of the cylinder. The cylinder was maintained in an oil bath capable of controlling temperature at 200°±1° F., (93.3°±0.6° C.), and large enough to permit the cylinder to be immersed at least to the 90-ml. mark. Nitrogen was supplied to the cylinder at the rate of 0.2 cubic feet per hour, employing a calibrated flowmeter. Each test sample was heated to 120° F. (48.9° C.) and then cooled, before testing, to 75°±5° F. (23.9°±2.8° C.) in a constant temperature room. With the nitrogen hose disconnected between the flowmeter and the delivery tube to the diffuser, the latter was allowed to soak in the oil for 5 minutes; at the end of which time the nitrogen flow was started through the diffuser. Readings of the top and bottom foam levels were taken at the end of a 5-minute period. The volume of foam was calculated from the two readings.

Employing the above-described testing procedure, there was determined the antifoaming effects of said 5,6-epoxy-6-methyl-2-heptanone and said mixture of adducts, respectively, when added to the oil in the concentrations shown below. The following results were obtained:

| Agent Tested | Concentration of Test Sample, Weight Percent | Foam, cc., at 5 Minutes |
|---|---|---|
| Blank | | 50 |
| 5,6-epoxy-6-methyl-2-heptanone | 0.1 | 50 |
| Do | 0.2 | 50 |
| Higher adduct of Example 2 | 0.02 | 10 |
| Do | 0.025 | 2 |
| Do | 0.03 | none |
| Do | 0.05 | none |

Operating as in Examples 1 and 2, other saturated, aliphatic aldehydes may be similarly reacted with butadiene monoxide to give adducts in which one mole of the aldehyde has combined with from one to 20 moles of the oxide. Thus, butadiene monoxide adds to one mole of propionaldehyde to give 6,7-epoxy-3-heptanone and adducts in which from 2 to 20 moles of butadiene monoxide are combined with one mole of propionaldehyde. n-Valeraldehyde similarly yields the 1:1 adduct, 1,2-epoxy-5-nonanone, and products in which from 2 to 20 moles of butadiene monoxide are combined with one mole of n-valeraldehyde. Hexaldehyde with butadiene monoxide yields 1,2-epoxy-5-decanone and the higher ratio adducts and heptaldehyde gives 1,2-epoxy-5-undecanone and the higher addition products.

The present aldehyde-butadiene monoxide adducts are viscous, highly stable liquids which are advantageously employed for a variety of industrial purposes. While adducts of one mole of the aldehyde with from 2 to 20 moles of the oxide are particularly valuable as anti-foaming additives to lubricants, they also find use as softeners for natural rubbers or synthetic rubbers such as the polymers and copolymers of 1,3-butadiene compounds. Particularly useful as rubber softeners are the adducts of the lower aldehydes, e. g., propionaldehyde or butyraldehyde with from 2 to 4 moles of butadiene monoxide. Especially useful as plasticizers for synthetic resins and plastics are the adducts of the higher aldehydes, e. g., lauric aldehyde with from 2 to 50 moles of butadiene monoxide. Adducts in which from 2 to 20 moles of the oxide have combined with one mole of the aldehyde possess very good viscosity characteristics; this together with their pronounced heat-stability and low volatility recommends them for use as viscosity-improving lubricant additives. The adducts of higher oxide: aldehyde ratio, i. e., those in which from 10 to 20 moles of butadiene monoxide have combined with one mole of the aldehyde have very good thickening properties and are advantageously employed as cosmetic bases, emulsifying agents, etc.

What I claim is:

1. A liquid mixture of adducts of butadiene monoxide and a saturated aliphatic aldehyde, said adducts having the formula

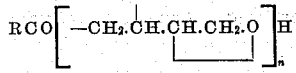

in which $n$ is an integer of from 2 to 20 and R is an alkyl radical of from 1 to 17 carbon atoms.

2. A liquid mixture of adducts of butadiene monoxide and butyraldehyde, said adducts having the formula

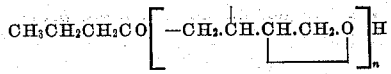

in which $n$ is an integer of from 2 to 20.

3. The process which comprises contacting butadiene monoxide, in the presence of a peroxidic free radical liberating agent as catalyst, with a saturated aliphatic aldehyde having the formula RCHO in which R is an alkyl radical of from 1 to 17 carbon atoms and recovering from the resulting reaction product an adduct in which one mole of the aldehyde has combined with from 1 to 20 moles of butadiene monoxide.

4. The process which comprises contacting butadiene monoxide, in the presence of a peroxidic free radical liberating agent as catalyst, with a saturated aliphatic aldehyde having the formula RCHO in which R is an alkyl radical of from 1 to 17 carbon atoms and recovering from the resulting reaction product a liquid mixture of adducts in which one mole of the aldehyde has combined with from 2 to 20 moles of butadiene monoxide.

5. The process which comprises contacting butadiene monoxide, in the presence of a peroxidic free radical liberating agent as catalyst, with a saturated aliphatic aldehyde having the formula RCHO in which R is an alkyl radical of from 1 to 17 carbon atoms and recovering from the resulting reaction product a liquid mixture of adducts in which one mole of the aldehyde is combined with one mole of butadiene monoxide.

6. The process which comprises contacting $n$-butyraldehyde with butadiene monoxide, in the presence of a peroxidic free radical liberating agent as catalyst, and recovering from the resulting reaction product a liquid mixture of adducts in which one mole of the aldehyde is combined with from 2 to 20 moles of butadiene monoxide.

7. The process which comprises contacting propionaldehyde with butadiene monoxide, in the presence of a peroxidic free radical liberating agent as catalyst, and recovering from the resulting reaction product a liquid mixture of adducts in which one mole of the aldehyde is combined with from 1 to 20 moles of butadiene monoxide.

8. The process which comprises contacting hexaldehyde with butadiene monoxide, in the presence of a peroxidic free radical liberating agent as catalyst, and recovering from the resulting reaction product a liquid mixture of adducts in which one mole of the aldehyde is combined with from 1 to 20 moles of butadiene monoxide.

9. The process which comprises contacting $n$-valeraldehyde with butadiene monoxide, in the presence of a peroxidic free radical liberating agent as catalyst, and recovering from the resulting reaction product a liquid mixture of adducts in which one mole of the aldehyde is combined with from 1 to 20 moles of butadiene monoxide.

10. The process which comprises contacting heptaldehyde with butadiene monoxide, in the presence of a peroxidic free radical liberating agent as catalyst, and recovering from the resulting reaction product a liquid mixture of adducts in which one mole of the aldehyde is combined with from 1 to 20 moles of butadiene monoxide.

11. The process which comprises contacting $n$-butyraldehyde with butadiene monoxide, in the presence of a peroxidic free radical liberating agent as catalyst, and recovering 7,8-epoxy-4-octanone from the resulting reaction product.

References Cited in the file of this patent

UNITED STATES PATENTS 2,644,794 Fields _____ July 7, 1953

OTHER REFERENCES

Prilezhaev: Chem. Abstracts (1912), vol. 6, pp. 348–49.